(12) United States Patent
Haustein et al.

(10) Patent No.: US 8,055,891 B2
(45) Date of Patent: *Nov. 8, 2011

(54) METHOD FOR THE AUTONOMIC CONFIGURATION OF A DATA STORAGE DEVICE

(75) Inventors: Nils Haustein, Zornheim (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/249,188

(22) Filed: Oct. 10, 2008

(65) Prior Publication Data

US 2009/0037723 A1    Feb. 5, 2009

Related U.S. Application Data

(63) Continuation of application No. 11/184,609, filed on Jul. 19, 2005, now Pat. No. 7,437,545.

(51) Int. Cl.
*G06F 15/177* (2006.01)
(52) U.S. Cl. ................ 713/1; 713/2; 713/100
(58) Field of Classification Search .......... 713/1, 2, 713/100
See application file for complete search history.

(56) References Cited

U.S. PATENT DOCUMENTS

| | | | |
|---|---|---|---|
| 6,205,527 B1 | 3/2001 | Goshey et al. | |
| 6,477,629 B1 | 11/2002 | Goshey et al. | |
| 6,779,130 B2 | 8/2004 | Sprunt et al. | |
| 6,854,009 B1 | 2/2005 | Hughes | |
| 6,880,101 B2 | 4/2005 | Golasky et al. | |
| 7,437,545 B2 * | 10/2008 | Haustein et al. | 713/1 |
| 2002/0053047 A1 | 5/2002 | Gold | |
| 2002/0083362 A1 | 6/2002 | Semo et al. | |
| 2003/0131170 A1 | 7/2003 | Chen et al. | |
| 2004/0047299 A1 | 3/2004 | Dorundo et al. | |
| 2004/0083357 A1 | 4/2004 | Duncan et al. | |
| 2006/0005048 A1 | 1/2006 | Osaki et al. | |

* cited by examiner

*Primary Examiner* — Dennis M Butler
(74) *Attorney, Agent, or Firm* — Kunzler Needham Massey & Thorpe

(57) ABSTRACT

A method is disclosed for configuring a data storage device. A storage module stores configuration data on a remote storage system that may include operating systems, applications, updates, and an index. A boot module boots a computer system from a program other than the regular boot program to provide access to a network in communication with the remote storage system. A device configuration module autonomically downloads and installs the operating systems, applications, and updates in response to data stored in an index on the remote storage system.

20 Claims, 4 Drawing Sheets

METHOD FOR THE AUTONOMIC CONFIGURATION OF A DATA STORAGE DEVICE

CROSS-REFERENCES TO RELATED APPLICATIONS

This application is a continuation of and claims priority to U.S. patent application Ser. No. 11/184,609 entitled "APPARATUS, SYSTEM, AND METHOD FOR THE AUTONOMIC CONFIGURATION OF A STORAGE DEVICE" and filed on Jul. 19, 2005 for Nils Haustein et al., which is incorporated herein by reference.

BACKGROUND OF THE INVENTION

1. Field of the Invention

This invention relates to the configuration of data storage devices and more particularly relates to the autonomic configuration and restoration of data storage devices.

2. Description of the Related Art

Modern technological trends have resulted in the heavy reliance of businesses on electrical data storage devices. These devices, such as hard disk drives (HDD), are used to run operating systems and applications, as well as store vast amounts of data. Many of the programs stored on these devices require regular updates and patches, and may require the installation of new versions of operating systems and applications. Entities such as large corporations or even small businesses spend large amounts of time and money to keep the programs up to date. When a data storage device fails, a company may incur high costs due to the time required to reconfigure a replacement device and the possible loss of important data.

In order to prevent data loss and allow quick recovery, many entities rely on storage backups. A backup of data may be stored on removable media, such as tapes or writable optical disks, or may be stored on a remote storage server. Storage servers are typically located on a common network and are configured to share data with nodes on the network. Various entities utilize data storage in several different ways to minimize the risk of high costs.

In one implementation, only back-up data is stored on the remote storage system. Consequently, in the event of a device failure, the user can restore lost data to a local storage device from the remote storage system. This implementation protects the company from suffering catastrophic data loss, but it does not allow for autonomic updates or the autonomic restoration of operating systems, applications, and updates on a failed storage device. The cost of manually reconfiguring a new storage device before the backed up data can be retrieved is substantial.

In another implementation, entities use a second storage device to exactly replicate (mirror) data from the local storage device. Then, when the first storage device fails, the second device can be used as the primary storage device, or the data can be copied onto a new storage device that can be used to replace the defective device. This implementation allows for the recovery of operating systems and programs, as well as backed up data; however, it does not provide autonomic recovery. Additionally, the amount of storage required is immense, and the cost of purchasing and licensing software for a second storage device can be extreme.

Even when a data storage device does not fail, it may be necessary to reconfigure that device to a previous state or an updated state. This can also result in costly losses of time and money. In order to prevent this, some entities store the operating system and applications on a network server and individual users execute the programs across the network. While this implementation prevents the need for updating and configuring a local data storage device for each user, a failure of the network server can result in catastrophic losses in production for all users of the network. Additionally, users must always be connected to the network in order to run the operating system and applications.

From the foregoing discussion, it should be apparent that a need exists for an apparatus, system, and method that provide autonomic configuration of data storage devices including restorations and updates. Beneficially, such an apparatus, system, and method would allow a reduction in required storage space, lower the cost of reconfiguring a storage device, and allow reliable and quick recovery from failures or reconfigurations.

SUMMARY OF THE INVENTION

The present invention has been developed in response to the present state of the art, and in particular, in response to the problems and needs in the art that have not yet been fully solved by currently available data storage solutions. Accordingly, the present invention has been developed to provide a method for configuring a data storage device that overcomes many or all of the above-discussed shortcomings in the art.

A method of the present invention is presented for configuring a data storage device. In one embodiment, the method includes: storing configuration data on a remote storage system; booting a computer system from a program other than the regular boot program, and thereby gaining access to a network in electronic communication with the remote storage system; and autonomically configuring a data storage device that is in electrical communication with the computer system in response to data found in an index on the remote storage system.

The method, in one embodiment, autonomically configures a data storage device, such as a Hard Disk Drive (HDD), that is previously unused (bare metal restore). In a further embodiment, the method detects the failure of a data storage device in electrical communication with the computer system, then detects when a replacement device is ready to be autonomically configured. The method may also comprise detecting a data storage device already in electrical communication with the computer system that becomes the replacement device in response to the detection of a defective storage device.

In one embodiment, a method is also provided for deploying computing infrastructure configured to autonomically configure a data storage device including developing a software tool kit comprising a plurality of extendable modules, the modules being configured to store configuration data on a remote storage system; boot a computer system from a program other than the regular boot program, and thereby gain access to a network in electronic communication with the remote storage system; and autonomically configure a data storage device that is in electrical communication with the computer system in response to data found in an index on the remote storage system. In a further embodiment, the method integrates a transaction service with the software tool kit, and the software tool kit may be subsequently published.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
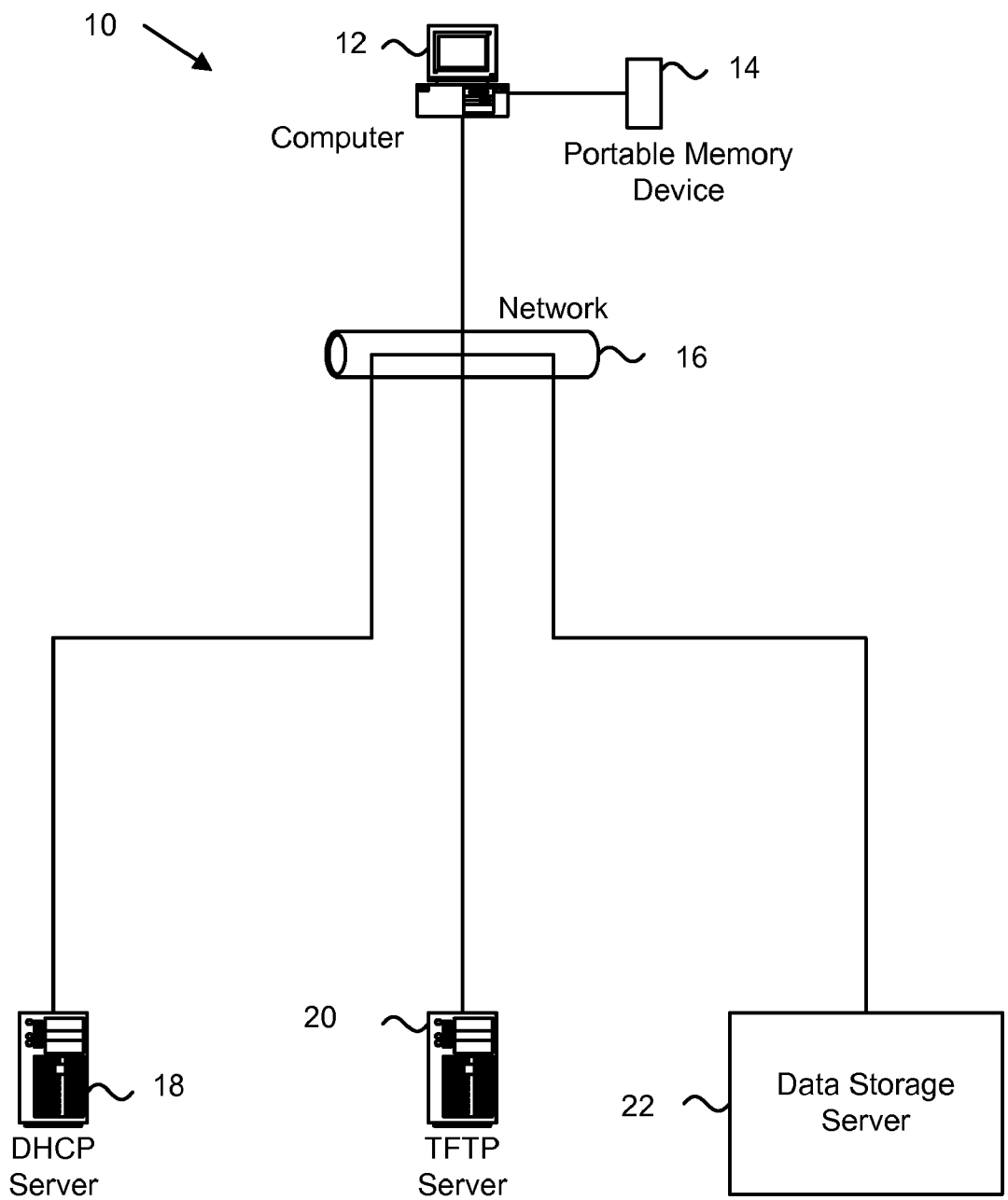
FIG. 1 is a schematic block diagram illustrating one embodiment of a system for the autonomic configuration of a data storage device in accordance with the present invention.

FIG. 1 depicts a system 10 that may be used for implementing certain embodiments of the present invention for autonomically configuring a data storage device. The system 10 includes a computer 12, such as a personal computer, laptop, client, or server, connected to a portable memory device 14 and a network 16. The portable memory device 14 may be a Memory Stick, floppy disk, or other device as will be readily recognized by one skilled in the art. The network 16 is also shown connected to a Dynamic Host Configuration Protocol (DHCP) server 18 and a Trivial File Transfer Protocol (TFTP) server 20. A data storage server 22 is also connected to the network 16. The DCHP server 18 assigns dynamic IP addresses to devices on the network 16. With dynamic addressing, a device can be assigned a different IP address every time it connects to the network. DHCP also supports a mix of static and dynamic addresses. The computer 12 may query the DHCP server 18 to find the current addresses of the TFTP server 20 and the Data Storage Server 22, before attempting to contact the servers 20 and 22. The TFTP server 20 uses User Diagram Protocol (UDP) to boot diskless workstations, X-terminals, and routers. One skilled in the art will recognize other storage area network, computer network, and internet configurations including other data storage devices, computers, workstations, mainframe computers, personal computers, printers, and other peripherals that may be used with the present invention.

Figure 2:
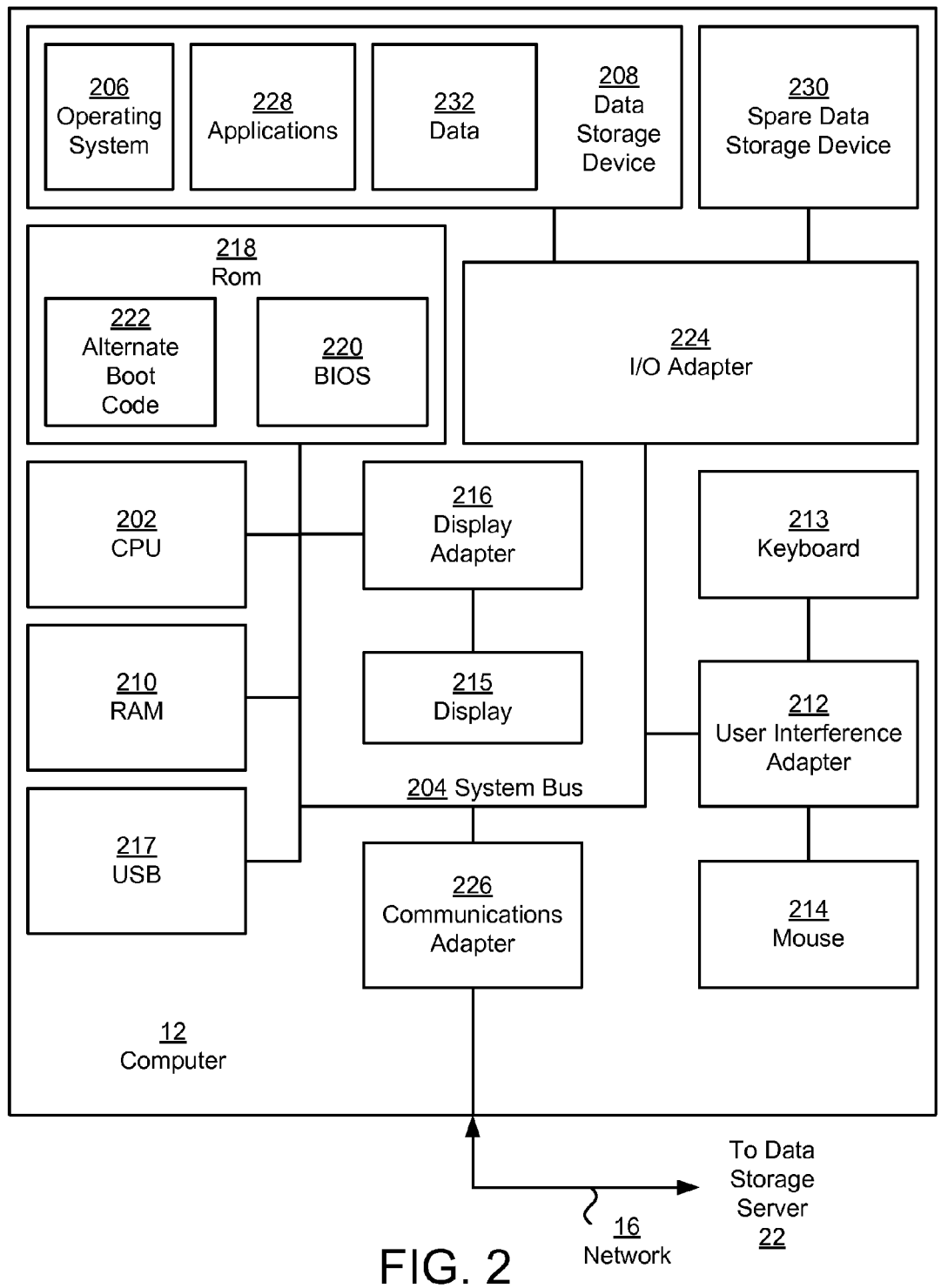
FIG. 2 is a schematic block diagram illustrating one embodiment of a computer system in accordance with the present invention.

FIG. 2 is a schematic block diagram illustrating one embodiment of the computer 12 in accordance with the present invention. The computer 12 may be a personal computer, notebook, client, server or other type of bootable computer as will be readily recognized by one skilled in the art. As depicted, the Computer 12 has a central processing unit (CPU) 202 coupled to various other components by the system bus 204. An operating system 206 is stored on the Data Storage Device (DSD) 208. The DSD 208 may be a hard disk drive (HDD), digital versatile disk (DVD), phase change (PC), optical disk drive, or any other device as will be recognized by one skilled in the art. When the computer 12 is booted, the operating system 206 is loaded into the RAM 210 and is executed by the CPU 202. The operating system 206 provides control of the computer 12, the user interface adapter 212, and the attached DSD 208. The input devices shown as a Keyboard 213 and a mouse 214, each of which connect to the user interface adapter 212, could alternately be a touchpad, trackball, or any other suitable interface device as will be recognized by one skilled in the art.

The display 215 attaches to the computer 12 via the display adapter 216. The USB 217 is provided so that, in one embodiment, the portable memory device 14 may connect to the computer 12.

A Read Only Memory (ROM) 218 is coupled to the system bus 204 and, in one embodiment, includes a BIOS 220 (Basic Input Output System) which controls the fundamental operations of the computer. An alternate boot code 222 is also shown that allows the computer 12 to boot and access the network 16 even without a functional DSD 208. For example, a HDD normally used to boot the computer 12 may have been rendered inoperable due to a failure, and the alternate boot code can then be used to boot the computer across a network. In one embodiment, the boot code may be iBOOT Code provided by IBM of White Plains, N.Y. IBM's iBOOT technology allows a computer to boot across a network by downloading a root file system and executing a kernel operating system through Trivial File Transfer Protocol (TFTP). Unlike other remote boot programs, iBOOT can be used to boot Microsoft Windows operating systems as well as other operating systems. In an alternate embodiment; however, other programs such as Etherboot or Intel's Pre-Boot Execution Environment (PXE) may also be used. Although alternate boot Code 222 is shown as a separate entity, it could be integral with BIOS 220 in an alternate embodiment.

The Random Access Memory (RAM) 210, I/O adapter 224, and communications adapter 226 are also coupled to the System Bus 204. In one embodiment, the I/O adapter 224 may be a small computer system interface (SCSI) adapter, so that the computer 12 communicates with the DSD 208. The communications adapter 226 communicates with the network 16 and may be an Ethernet, Fiber Channel, ESCON, FICON, Wide Area Network (WAN), TCP/IP or other interface as will be readily recognized by one skilled in the art.

The data used to operate the computer 12 is stored on the DSD 208. In one embodiment, the computer 12 has a spare data storage device 230 to be used in the event the DSD 208 fails. In one embodiment, the spare data storage device 230 may be a previously unused data storage device such as a bare metal HDD, meaning that it does not have an operating system, applications, or data pre-stored on it. The spare data storage device 230 may remain dormant until the DSD 208 requires replacing. This means it is unnecessary to update the spare data storage device 208 every time there is an upgrade to the operating system 206, applications 228, or a change in data 232. The spare data storage device 230, in one embodiment, is already electronically connected to the I/O adapter 224 so that a manual connection is unnecessary should the DSD 208 fail. The spare data storage device 230 may also be purchased "on demand" meaning that it is already connected to the computer but is not purchased until its use is needed. In another embodiment, however, the spare data storage device 230 can be purchased and connected after the failure of the DSD 208 is detected or any time a replacement device is needed. If the spare data storage device 230 is a hard disk drive, the computer 12 may periodically spin up the spare data storage device 230 to its operating speed, to evenly spread the lubricant on the hard disks, as surface tension may tend to cause the lubricant to aggregate towards the center of disks which are left idle too long.

Figure 3:
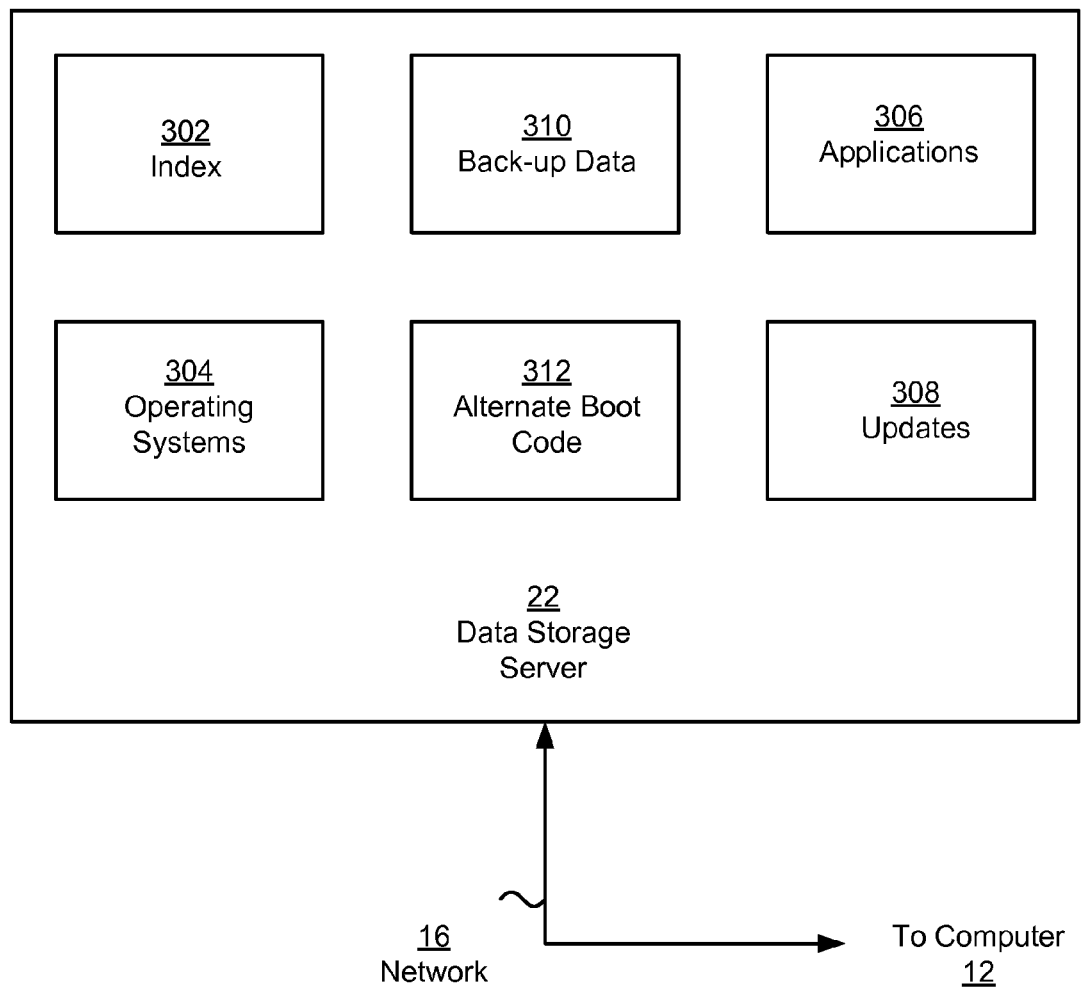
FIG. 3 is a schematic block diagram illustrating one embodiment of a data storage server in accordance with the present invention.

FIG. 3 is a schematic block diagram illustrating one embodiment of the data storage server 22 in accordance with the present invention. In this embodiment, the data storage server 22 acts as an Internet small computer system interface (iSCSI) target. iSCSI is an IP based standard for linking data storage devices over a network and transferring data by carrying SCSI commands over IP networks. The data storage server 22 contains an index 302, operating systems 304, applications 306, and updates 308. In one embodiment, the index 302 may record a list of the current contents of the DSD 208 such as operating systems, applications, and updates so the spare data storage device 230 can be similarly configured in the event of a failure. In another embodiment, the index may store information determining which operating systems 304, applications 306, and updates 308 will be used in the next configuration of the DSD 208 or the spare data storage device 230 in the event a change in disk configuration is needed. Because multiple users often utilize the same programs, storage space is saved because a single instance of the software can be referenced by multiple indexes. The back-up data 310, corresponding to the DSD 208, is also stored on the data storage server 22. In yet another embodiment, an exact image of the DSD 208 may be stored on the data storage server 22.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
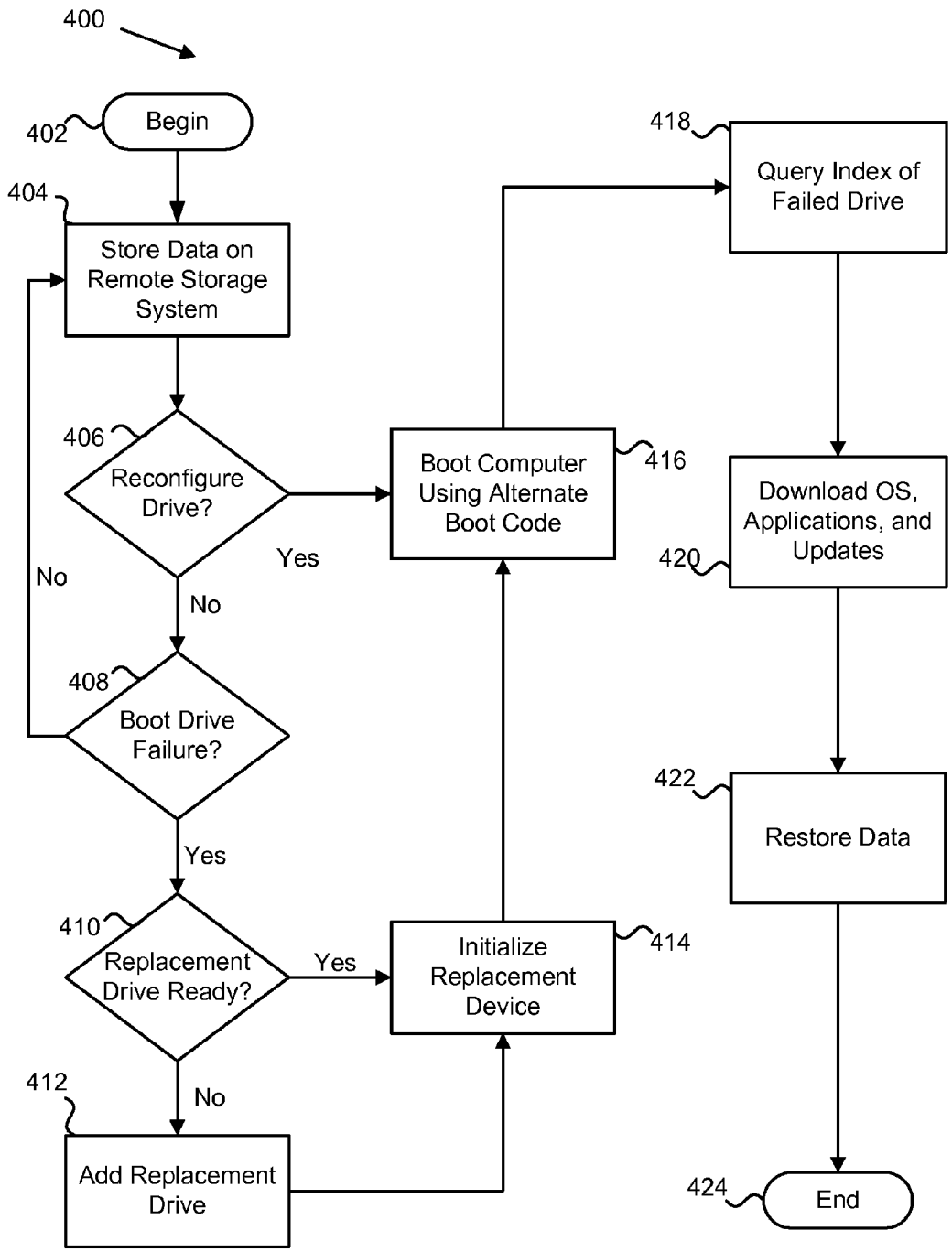
FIG. 4 is a schematic flow chart diagram illustrating one embodiment of a method for autonomically configuring a data storage device in accordance with the present invention.

FIG. 4 is a schematic flow chart diagram illustrating one embodiment of a method 400 for the autonomic configuration of a data storage device. The method 400 may be conducted using the system and apparatus of FIGS. 1-3, or may be conducted independent thereof. In one embodiment, the method 400 begins at step 402 and data is stored on a remote storage system such as the data storage server 22 in step 404. The data may include a list identifying the operating systems 304, applications 306, and updates 308 as well as the back-up data 310 corresponding to the DSD 208. In another embodiment, the data may identify different operating systems, applications, and updates stored on the data storage server 22 that are to be installed when the DSD 208 is reconfigured.

Once the data has been stored on the remote storage system, the method 400 continues to block 406. A determination is made whether or not the DSD 208 needs to be reconfigured. In one embodiment, user input may determine whether or not a reconfiguration is needed, and in another embodiment, a disk may be reconfigured or updated periodically according to a preset time table.

If the DSD 208 does need to be reconfigured, then method 400 proceeds to step 416 discussed below, and if the device does not need to be reconfigured, then the DSD 208 is tested for failure in block 408. In one embodiment, device failure may be detected using Self-monitoring Analysis and Reporting Technology (S.M.A.R.T.) that is designed to provide sufficient warning of a failure to allow data back-up before an actual failure occurs. S.M.A.R.T. measures error rates and predicts a failure when a device is performing unacceptably for a period of time. In another embodiment, a device failure is detected when the I/O adapter 224 cannot establish I/O communications with the DSD 208.

If a device failure is detected, then method 400 detects whether a replacement data storage device is ready in step 410. If a failure is not detected, then method 400 returns to step 404 mentioned above. In one embodiment, the computer 12 is already connected to the spare data storage device 230 which is typically the same type of storage as DSD 208 and typically has the same or greater data capacity as DSD 208. Once detected, this device will be assigned as the replacement device for DSD 208. If the spare data storage device 230 is ready as a replacement device, then method 400 continues to step 414 discussed below. If a spare device is not present, method 400 will continue to box 412 where a replacement device is added. In one embodiment, the replacement data storage device has the same I/O interface as the DSD 208 so it is "plug compatible." Then, in step 414, the replacement device is initialized. In one embodiment, this means the replacement device is in communication with the I/O adapter 224, is powered on, and is spun up to its operating rotational speed.

In step 416, the computer 12 is re-booted using the alternate boot code 222. In one embodiment, the alternate boot code 222 is stored in ROM 218, and in another embodiment, it is stored in the portable memory device 14 or other storage device as will be readily recognized by one skilled in the art. The alternate boot code 222 allows the computer 12 to boot and access the network 16 even when the DSD 208 is not functioning. In one embodiment using IBM's iBOOT code, the iBOOT client, computer 12, obtains the IP address for the TFTP server 20 from the DHCP server 18. A boot request is then made to the TFTP server 20 which returns an iBOOT firmware file 312. At this point, iBOOT is completely running on the computer 12. Next, the IP address for the iSCSI target, data storage server 22, is requested and received. The computer 12 is now able to perform an iSCSI login and complete the steps necessary for all I/O to go through iSCSI.

In step 418, the index 302 is accessed on the data storage server 22. In one embodiment, the index 302 lists which of the operating systems 304 the computer 12 was previously running, such as Microsoft Windows, Macintosh, AIX, UNIX, LINUX, etc.; which of the applications 306 were previously installed on the DSD 208; which of the updates 308 had been made to these programs; and identifies the back-up data 310 corresponding to DSD 208. In another embodiment, the operating systems 304, applications 306, and updates 308 may be different from those previously installed on the DSD 208, providing instead a new configuration for either the DSD 208 or the spare data storage device 230. In yet another embodiment, the data stored on the data storage server 22 may be an exact image of the DSD 208, and may be directly copied to the spare data storage device 230 in the event the DSD 208 fails.

In step 420, the operating systems 304, applications 306, and updates 308 specified in the index 302 are downloaded from the data storage server 22 and installed on the DSD 208 or the spare data storage device 230. Finally, in step 422, previously backed up data is restored to the DSD 208 or spare data storage device 230 from the back-up data 310. The method 400 ends in step 424.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for autonomically configuring a data storage device, the method performed by executable code stored in Random Access Memory (RAM), executed by a Central Processing Unit (CPU), and comprising:
   storing configuration data on a remote storage system, the configuration data comprising operating systems, applications, and updates for multiple users with single instances of shared operating systems, applications, and updates and an index listing which operating systems, applications, and updates are used on a next configuration of a data storage device;
   booting a computer system from an alternate boot program other than the regular boot program, the alternate boot program downloading a root file system through a Trivial File Transfer Protocol (TFTP) and executing a kernel operating system through the TFTP, the alternate boot program providing access to a network in electronic communication with the remote storage system; and
   configuring the data storage device that is in electrical communication with the computer system using the stored operating systems, applications, and updates using the index on the remote storage system.

2. The method of claim 1, wherein the data storage device is previously unused.

3. The method of claim 1, the method further detecting a failure of the data storage device.

4. The method of claim 3, the method further comprising an operation for detecting when a replacement storage device is ready.

5. The method of claim 4, the method further comprising detecting a spare storage device and assigning the spare storage device as the replacement device in response to detecting the failed data storage device.

6. The method of claim 1, wherein the index further comprises a listing of the operating systems, applications, and updates of a current configuration stored on the remote storage system.

7. The method of claim 6, wherein the data storage device is configured by downloading and installing the operating systems, applications, and updates listed in the index.

8. The method of claim 1, wherein the configuration data stored on the remote storage system is an exact copy of the data stored on the data storage device.

9. The method of claim 8, wherein a replacement storage device is configured by transferring the exact copy of data to the replacement data storage device.

10. The method of claim 1, wherein the alternate boot program obtains an address for the TFTP from a Dynamic Host Configuration Protocol (DHCP) server.

11. A method for deploying computing infrastructure configured to autonomically configure a data storage device, the method performed by executable code stored in RAM, executed by a CPU, and comprising:
    developing a software tool kit comprising a plurality of extendable modules, the modules comprising executable code stored in the RAM, executed by the CPU, and configured to store configuration data on the remote storage system, the configuration data comprising operating systems, applications, and updates for multiple users with single instances of shared operating systems, applications, and updates and an index listing which operating systems, applications, and updates are used on a next configuration of a data storage device;

boot a computer system from an alternate boot program other than the regular boot program, the alternate boot program downloading a root file system through a TFTP and executing a kernel operating system through the TFTP, the alternate boot program providing access to a network in electronic communication with the remote storage system; and configure the data storage device that is in electrical communication with the computer system using the stored operating systems, applications, and updates using the index on the remote storage system;

integrating a transaction service with the software tool kit; and publishing the software tool kit.

12. The method of claim 11, wherein the data storage device is previously unused.

13. The method of claim 11, the method further detecting a failure of the data storage device.

14. The method of claim 13, the method further comprising an operation for detecting when a replacement storage device is ready.

15. The method of claim 14, the method further comprising detecting a spare storage device and assigning the spare storage device as the replacement device in response to detecting the failed data storage device.

16. The method of claim 11, wherein the index further comprises a listing of the operating systems, applications, and updates of a current configuration stored on the remote storage system.

17. The method of claim 16, wherein the data storage device is configured by downloading and installing the operating systems, applications and updates listed in the index.

18. The method of claim 11, wherein the configuration data stored on the remote storage system is an exact copy of the data stored on the data storage device.

19. The method of claim 18, wherein a replacement storage device is configured by transferring the exact copy of data to the replacement data storage device.

20. The method of claim 11, wherein the alternate boot program obtains an address for the TFTP from a DHCP server.

* * * * *